May 17, 1966 H. C. WESCOMBE 3,251,535
AIR COMPRESSOR CONTROL MEANS
Filed June 19, 1963
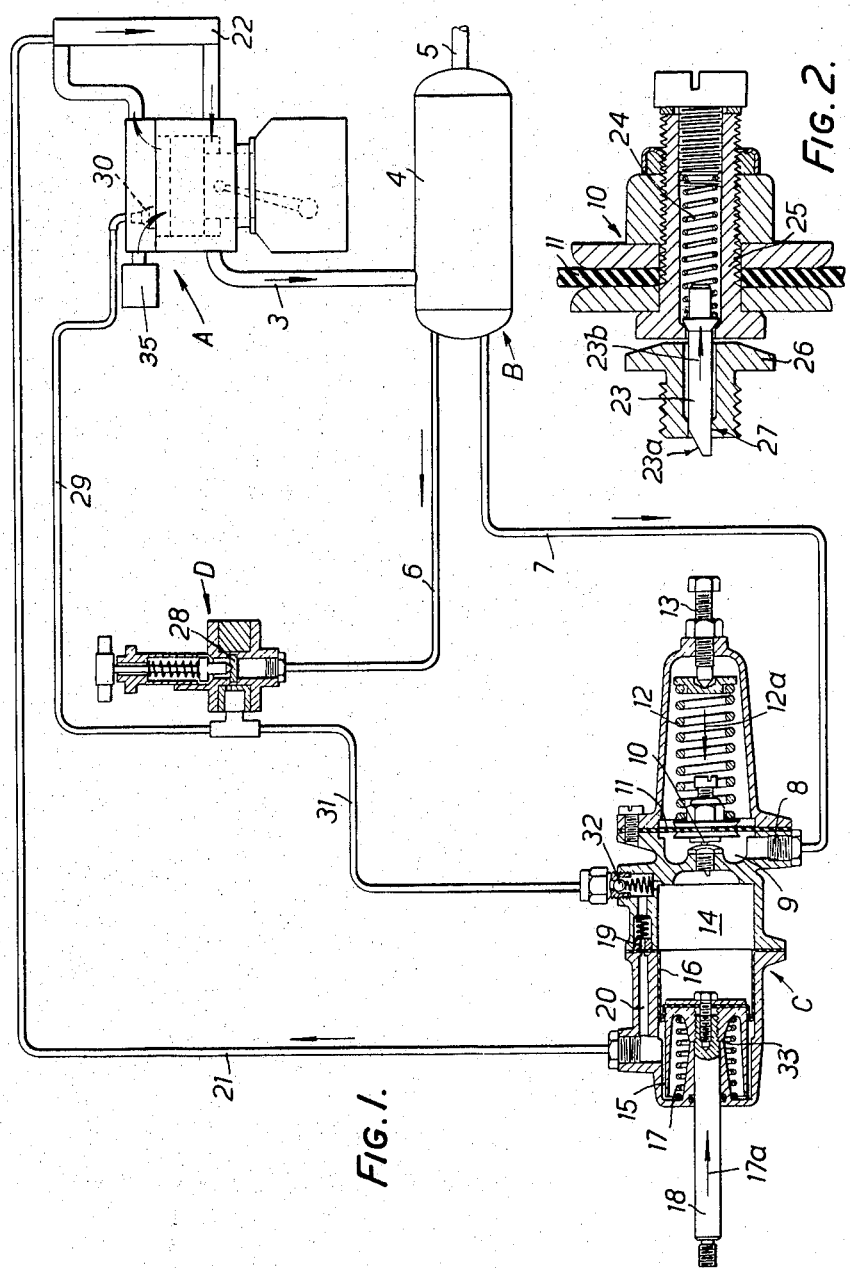
INVENTOR
HUGH CARLISLE WESCOMBE
By Hane and Nydick
ATTORNEY

United States Patent Office 3,251,535
Patented May 17, 1966

3,251,535
AIR COMPRESSOR CONTROL MEANS
Hugh Carlisle Wescombe, Downend, Bristol, England, assignor to Bristol Pneumatic Tools Limited, Fishponds, Bristol, England, a British company
Filed June 19, 1963, Ser. No. 289,092
Claims priority, application Great Britain, June 21, 1962, 23,922
7 Claims. (Cl. 230—9)

This invention relates to means for automatically regulating the volumetric output of an air compressor in accordance with the demand for compressed air whilst maintaining a nearly constant working pressure.

Air compressors are used for various purposes and the volume of compressed air required from the compressor at any one time may vary considerably over any given period. For example when an air compressor is used for the supply of compressed air for the operation of a number of pneumatic drills, the necessary volumetric output of the compressor will vary according to the number of drills being operated at any given time; that is if only one drill is being used very much less compressed air will be required than when several drills are being used simultaneously.

The object of the present invention therefore is to provide means for automatically regulating the volumetric output of an air compressor in accordance with the demand and, in accordance with the invention, this is achieved by means which regulate the speed of the prime mover in dependence upon the air pressure in an air receiver for the storage of compressed air, the arrangement being such that the speed of the prime mover is increased automatically to increase the volumetric output of the compressor when the air pressure in the air receiver drops and is decreased to reduce the output of the compressor when the air pressure in the receiver rises.

The invention thus consists of means for automatically regulating volumetric output of an air compressor in accordance with the demand for compressed air whilst maintaining a nearly constant working pressure, comprising a pressure sensitive valve operated by compressed air from a compressed air storage receiver, which is connected with the outlet port of the compressor, to allow the passage of a variable quantity of air, dependent upon variations in the air pressure in said receiver, into an expansion chamber to operate a piston movable in said expansion chamber, said piston being connected with a throttle lever, governor or other speed control of the prime mover which drives the compressor.

According to a further aspect of the invention the automatic regulating means comprises a spring biased diaphragm controlled pressure sensitive valve mounted in a valve chamber in permanent communication with an air storage receiver connected with the outlet port of the compressor, said valve being operated by compressed air from said receiver to allow the passage of a variable quantity of air, dependent upon variations in the air pressure in said receiver, into an expansion chamber to operate a piston slidable in said chamber, said piston having a piston rod mechanically connected with a throttle lever or other speed control of a prime mover which drives the compressor, whereby the movement of the piston in said chamber controls the speed of said prime mover and therefore the output of the compressor.

In order that the invention may be more clearly understood one particular embodiment of the invention will now be described, by way of example with reference to the accompanying drawings wherein:

FIGURE 1 shows a sectional view of a control or regulating means according to the invention associated with a two-stage differential air compressor assembly and, FIGURE 2 is an axial section of a detail of the control or regulating means.

Referring to these drawings, an air compressor including a diagrammatically indicated prime mover 35 is indicated generally at A, a compressed air receiver at B and a control or regulating means at C whilst D indicates a so-called unloader which is conventionally used with air compressors and the purpose and function of which will be described hereinafter. The outlet port of the air compressor A is connected through a delivery pipe line 3 with an air storage receiver 4 which is adapted to be connected by means of an outlet pipe 5 with the pneumatic appliances (not shown) to be operated by the compressed air. The air receiver 4 is also connected, in conventional manner with the unloader D by means of a pipe line 6. A further pipe line 7 connects the receiver B also with the control or regulating device C through an inlet port 8 opening into the valve chamber 9 of a diaphragm controlled pressure sensitive valve 10 shown in detail in FIGURE 2 and hereinafter more fully described. The valve 10 is carried by a spring loaded diaphragm 11 biased in the direction of closing of the valve, i.e., in the direction of the arrow 12a by a helical spring 12. The compression of the spring 12 can be regulated by a screw 13.

The valve 10, under the control of the diaphragm 11, is adapted to allow the passage of a variable quantity of air from pipe 7 into an expansion chamber 14 through the valve chamber 9, the amount of air thus admitted into said expansion chamber being dependent upon the variation in pressure in the receiver 4. The expansion chamber 14 forms the cylinder in which operates a piston 15 sealed by a rolling diaphragm 16. The piston 15 is spring loaded by means of a helical compression spring 17 which biases the piston against the air pressure in said chamber 14, i.e., in the direction of arrow 17a. The piston is also provided with a piston rod 18 which is mechanically connected, in a manner not shown, with the throttle lever, governor or other speed control means of the prime mover 35 by which the compressor A is driven. The movement of the piston 15 to vary the speed of the prime mover is dependent upon the variations in air pressure in the receiver 4. The control device according to the invention operates as follows:

When the air compressor A is operating under a given constant pressure, that is when it is operating to supply compressed air to a given number of pneumatic appliances operating constantly, and the air pressure in the receiver 4 thus remains constant, the air pressure in the expansion chamber 14 of the control device C also remains constant and thus balances the piston 15; that is said piston remains stationary and consequently the speed of the prime mover remains constant. When however the demand for compressed air increases, for example when additional pneumatic appliances are set into operation, the pressure in the receiver 4 drops thus resulting in a drop in pressure in the valve chamber 9. This results in the diaphragm 11 being moved forward under the action of spring 12 to close valve 10 and thus prevent air under pressure from passing from the valve chamber 9 into the expansion chamber 14. The said expansion chamber is permanently in communication through a calibrated orifice 19, duct 20 and a pipe line 21 with the intercooler 22 situated between the first and second stages of compression of the air compressor A. Thus when the valve 10 is closed, preventing air from the receiver from entering the expansion chamber 14 as above described, the compressed air already in said expansion chamber is released through said orifice 19, duct 20 and pipe line 21 whereby the pressure in the expansion chamber 14 drops to allow the piston 15 to be moved in the direction of arrow 17a under the action of spring 17. The speed of the prime mover is thereby increased and this simultaneously increases the speed, and consequently the output, of the compressor to restore the lost pressure in the air receiver. Similarly when the air pressure in the receiver increases, for example when one or more of the pneumatic appliances being operated cease to be used, the air pressure in the valve chamber 9 increases and moves the diaphragm 11 against the action of spring 12 to open valve 10 and thus allow air under pressure to enter the expansion chamber 14. When air enters expansion chamber 14 at a greater rate than it can be exhausted through the orifice 19 the pressure in the expansion chamber increases with the result that the piston is moved in the opposite direction to the arrow 17a against the action of spring 17 to reduce the speed of the prime mover and thus also the speed and output of the compressor.

The valve 10 comprises a valve pin 23 (FIGURE 2) biased into its closed position by a compression spring 24, said valve pin 23 being axially slidable in the bore of a sleeve 25 carried by the diaphragm 11 and the bore of a gland nut 26 screwed into an aperture in the wall of the expansion chamber 14. The sleeve 25 and gland nut 26 are spaced apart so as to leave a passage for air to pass from the valve chamber 9 into the expansion chamber 14 via the bore of said gland nut when the valve is open. The outer free end of the valve pin fits with a close sliding fit in a portion of the bore of the gland nut which is of reduced diameter as indicated at 27. The said outer free end of the valve pin is provided on one side with a flat graduated taper, as shown at 23a, whereby the volume of air permitted to pass through the valve into the expansion chamber 14 will vary according to the degree of opening movement of the valve pin in the direction of arrow 23b.

The compressor is provided with a conventional unloader device D which comprises a valve 28 connected on one side by the pipe line 6 with the receiver 4 and on the other side by a pipe line 29 with an inlet valve 30 of the air compressor A. The unloader device D operates as follows:

When the pressure in the receiver 4 exceeds a predetermined value corresponding to the desired minimum speed, the unloader valve 28 is opened to allow air to flow through pipe line 29 to the inlet valve 30 or throttle device of the compressor to keep said valve open in the normal way and thereby prevent excess or overcompression. With the present invention the unloader D is used also to control the lower speed limit. For this purpose the unloader valve is connected, through a pipe line 31 and a non-return valve 32 with the expansion chamber 14 of the control device so that when air pressure is at maximum value air enters the expansion chamber 14 through the non-return valve 32 and raises the pressure in said expansion chamber to a value which will hold the piston 15 against a slow speed stop 33.

When air is withdrawn from the air receiver 4 resulting in a slight fall in pressure the unloader D resets and the compressor resumes the delivery of compressed air in the usual way. Simultaneously the air in the expansion chamber 14 is sealed from the unloader by the non-return valve 32 automatically and the speed of the prime mover and compressor increases to make good the pressure loss in the air receiver 4 under the influence of the control device.

The control device according to the invention has the following important advantages. The speed of the prime mover is at all times related to the output of the compressor and maximum speed will be obtained only during maximum output conditions, so that at all other times the speed and output will be reduced or increased as required with economy in running costs and reduction in wear and noise.

Total unloading occurs only at the minimum predetermined speed when the valve gear of the compressor is operating at a relatively slow speed, thus reducing wear of the valve gear.

The average speed under normal operating conditions will be well below maximum with the resulting extended life of all working parts.

The full maximum pressure as effecting the performance of the pneumatic appliances being operated, is automatically maintained throughout the capacity range of the air compressor.

The control is highly sensitive and the reliability absolute, both being achieved by the fact that there is absence of wearing contact and virtually no friction affecting the function of the control.

The exhausted air from the actuating cylinder being returned to a position between two stages of the compression cycle, ensures that this air is retained within the cycle of compression, and is not lost in terms of the capacity of the air compressor, which remains unaffected. Thus the small amount of compressed air required for the functioning of the control, is taken from the delivery side of the high pressure cylinder, expanded to the intermediate stage pressure, and restored by subsequent re-compression in that cylinder, and therefore represents the energy returned for the operation of the control.

The control is free from complication, compact, and economical of manufacture, foolproof in operation, and pre-set by a single adjustment to the control valve spring tension.

I claim:

1. A system for supplying compressed air, said system comprising, in combination, a variable output air compressor having an air intake and an air outlet and including a prime mover, an air storage receiver arranged for withdrawal of varying volumes of compressed air and connected to the air outlet of said air compressed to supply the receiver with compressed air, and control means controlling the volumetric output of said air compressor to vary said output in accordance with the air demand on the receiver while maintaining a substantially constant working pressure, said control means comprising a pressure sensitive valve means including a receiver chamber connected to said receiver to supply said chamber with air from the receiver, an expansion chamber separated from the receiver chamber by a partition wall including a flow opening, a control assembly for controlling an air flow from said receiver chamber into said expansion chamber, said control assembly including a diaphragm, a valve pin mounted on said diaphragm for lengthwise movement in unison with a deflection of the diaphragm, said pin closing said flow opening in one lengthwise position and uncovering said opening in another lengthwise position, said diaphragm being biased on one side by air pressure in said receiver chamber to deflect the diaphragm into a position in which the pin uncovers the flow opening to admit compressed air from the receiver chamber into the expansion chamber, a directional force means acting on the other side of the diaphragm to bias the diaphragm into a position in which the pin closes the flow opening whereby the position of the diaphragm is controlled by the pressure differential between the receiver chamber and the expansion chamber, a piston slidable in said expansion chamber sealed to the wall thereof, a spring means biasing said piston against the air pressure in the expansion chamber, the position of the piston in said chamber being controlled by the pressure differential between the air chamber in the expansion chamber and the counter pressure of the spring means, the piston being coupled to the prime mover of the air compressor for controlling the volumetric output of the compressor in accordance with the piston position, an intercooler, and conduit means connecting said intercooler to the expansion chamber and to the compressor for feeding air from the expansion chamber to the compressor via said intercooler thereby reducing the air pressure in the expansion chamber to effect a corresponding displacement of the piston in said chamber and an increase of the volumetric output of the compressor.

2. A system according to claim 1, wherein a valve sleeve is secured to said diaphragm transverse of the plane of deflection thereof, said valve pin being slidable in said sleeve, and wherein a spring means urges said pin into the position covering said flow opening.

3. A system according to claim 2, wherein said pin is a cylindrical pin having a flat one-sided taper at its end coacting with said flow opening.

4. A system according to claim 1, wherein an apertured member is fitted iinto said partition wall to line the flow opening therein, said valve pin being movable into and out of the aperture of said member.

5. A system according to claim 1, wherein a rolling diaphragm seals said piston to the wall of said expansion chamber.

6. A system according to claim 1, wherein said air compressor is a two-stage compressor, said intercooler being connected to the compressor between the first and the second stage thereof.

7. A system according to claim 1 and comprising an unloading means including a normally closed valve, said valve being arranged to open in response to an air pressure above a predetermined value, a first conduit connecting one side of said valve with the air intake of the air compressor and the other side with the storage receiver, a second conduit connecting said one side of the valve also to said expansion chamber, and a one-way valve included in said second conduit, said one-way valve opening in response to an air pressure above a predetermined value in said second conduit on the side thereof connected to the unloading means, said valve in the unloading means opening in response to an air pressure in said first conduit above a predetermined value.

References Cited by the Examiner

UNITED STATES PATENTS

| | | | |
|---|---|---|---|
| 2,454,363 | 11/1948 | Wineman | 230—9 |
| 2,629,536 | 2/1953 | Baker | 230—5 |
| 2,653,753 | 9/1953 | Davey | 230—5 |
| 2,725,181 | 11/1955 | Lamberton | 230—9 |
| 2,783,936 | 3/1957 | Kisller | 230—9 |
| 2,961,147 | 11/1960 | Osterkamp | 230—9 |

SAMUEL LEVINE, *Primary Examiner.*

DONLEY J. STOCKING, *Examiner.*

W. L. FREEH, *Assistant Examiner.*